United States Patent
Shen et al.

(10) Patent No.: US 8,573,256 B2
(45) Date of Patent: Nov. 5, 2013

(54) REVOLVING SWITCHING DEVICE

(75) Inventors: Libin Shen, Xiamen (CN); Tianyu Chen, Xiamen (CN); Bin Chen, Xiamen (CN); Huasong Zhou, Xiamen (CN)

(73) Assignees: Xiamen Solex High-Tech Industries, Xiamen (CN); Huasong Zhou, Xiamen (CN)

( * ) Notice: Subject to any disclaimer, the term of this patent is extended or adjusted under 35 U.S.C. 154(b) by 410 days.

(21) Appl. No.: 12/701,952

(22) Filed: Feb. 8, 2010

(65) Prior Publication Data

US 2011/0193002 A1    Aug. 11, 2011

(51) Int. Cl.
*F16K 11/085* (2006.01)
*E03C 1/04* (2006.01)

(52) U.S. Cl.
USPC ........... 137/625.19; 137/887; 251/352; 4/615

(58) Field of Classification Search
USPC ................. 137/625.19, 887; 251/352; 4/615
See application file for complete search history.

(56) References Cited

U.S. PATENT DOCUMENTS

| | | | | |
|---|---|---|---|---|
| 1,383,100 A | * | 6/1921 | Green | 239/445 |
| 3,112,073 A | * | 11/1963 | Larson et al. | 239/446 |
| 3,405,601 A | * | 10/1968 | Clarke | 91/4 R |
| 3,773,076 A | * | 11/1973 | Smith | 137/625.19 |
| 4,901,927 A | * | 2/1990 | Valdivia | 239/446 |

FOREIGN PATENT DOCUMENTS

CN    2768629 Y    4/2006

\* cited by examiner

*Primary Examiner* — John Fox
(74) *Attorney, Agent, or Firm* — Rabin & Berdo, P.C.

(57) ABSTRACT

A revolving switch device with a sleeve and an operating handle comprising: a body with two inlet holes, a first water passage and an installation hole connected between the upper inlet hole and said first water passage; a plug, sealed and mounted in the installation hole, is capable of revolving between a first and second position, said plug having an outer revolving surface with an arc groove, and the bottom of said plug is concave to form a second water passage, said outer revolving surface of said plug has a connecting hole, which having an inner end for connecting said second water passage and an outer end in the outer revolving surface. When the plug occupies the first position, said arc groove connects the upper inlet hole and first water passage. In the second position, the lower inlet connects to the outer end of the connecting hole.

7 Claims, 5 Drawing Sheets

REVOLVING SWITCHING DEVICE

FIELD OF THE INVENTION

The present invention relates to a shower device, and more particularly, to a revolving switching outlet device.

BACKGROUND OF THE INVENTION

When the showering devices are used in daily life, the switching of different outlet effect can add the convenience, practicability and function for the device, In prior art, such as CN200520081301, a utility model with the title of "shower and bathtub tap capable of automatic changing over", which relates to a bath apparatus capable of automatic changing over the water passage ways between the shower and bathtub. A flow division valve is provided for the device, the shower switch is closed in normal state, if the button is pushed, the valve plug is detached from the water inlet, open the shower switch, the water will flow directly from the shower, and the flow in the bathtub is automatically stopped, while when the shower switch is closed, the water can flow out from the bathtub, the bath apparatus is capable of automatic changing over the water passage ways between the shower and bathtub, but the structure is complex and need to mount two switches which are disposed in the bathtub and shower respectively, and the cost of production is increased correspondingly.

SUMMARY OF THE INVENTION

The primary object of the invention is to provide a revolving switching device, which obviate the problem of the prior art that the bath apparatus must provided with multiple of outlet devices.

The object is achieved by providing:

A revolving switch device, comprising:

a body provided with two inlet holes which are spaced up and down, a first water passage and an installation hole connected between the upper inlet hole and said first water passage;

a plug, sealed and revolvably mounted in the installation hole, is capable of revolving between a first position and a second position, said plug having an outer revolving surface provided with an arc groove, and the bottom of said plug is concaved to form a second water passage, said outer revolving surface of said plug is provided with a connecting hole, which having an inner end for connecting said second water passage and an outer end in the outer revolving surface;

Wherein when the plug is in the first position, said arc groove is connected the upper inlet hole to the first water passage, and the lower inlet is keep away from the outer end of the connecting hole; when the plug is in the second position, the lower inlet is connected to the outer end of the connecting hole, and the arc groove is keep away from the first water passage.

In a preferred embodiment of the invention, said revolving switch device further comprises an inlet tube mounted on said body and connected with the two inlet holes.

In a preferred embodiment of the invention, said outer revolving surface is concaved to form an installation groove, said installation groove is provided with an elastomer and a sealing member which is urged outwardly by said elastomer.

In a preferred embodiment of the invention, said installation groove is disposed in the center of said outer revolving surface which is opposite to said arc groove, said center of said installation groove is in a same axial plane with the arc groove.

In a preferred embodiment of the invention, the axis of said plug is vertical to said body, the outer end of said connecting hole is opposite to the installation groove in the axial projection.

In a preferred embodiment of the invention, said plug is provided with a first position hole corresponding to said first position and a second position hole corresponding to said second position, and said body is provided with an elastomer and a position pin urged by said elastomer, said position pin is selectively inserted into said first position hole or second position hole.

In a preferred embodiment of the invention, said revolving switch device further comprises a sleeve and an operating handle which is fixed to the lower end of said plug, said sleeve is sleeved on said plug and the upper end and lower end are revolvably connected to the body and operating handle respectively.

Compared with the prior art, the present invention has simple structure, and need not to mount multiple switches to different outlets, in operation, the switching of different water passages just only need to revolve the plug or operating handle, and need not any operations on the body, and need not to reach higher position to switch (because most bodies are mounted high in wall); the body and the plug of the switching unit is co-operating tightly, and the first water passage and the upper inlet hole are connected by the arc groove, or the second water passage and lower inlet hole are connected by the connecting hole, this design can selectively to connect or cut the different water passages to achieve different outlet functions.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts, in which.

NUMERALS body-100; first inlet hole-110; second inlet hole-120; first water passage-130; installation hole-140;

plug-200; outer revolving furface-210; arc groove-220; second water passage-230; connecting hole-240; inner end-241; outer end-242; installation groove-250; elastomer-251; sealing member-252; first position hole-260, second position hole-270; elastomer-280; position pin-290;

inlet pipe-300; pipe sleeve-400; operating handle-500; overhead shower-600; first outlet pipe-700; second outlet pipe-800; sealing ring-O

DETAILED DESCRIPTION OF THE PREFERRED EMBODIMENT

Referring to FIG. 1 to FIG. 5, which show the revolving switch device of the present invention.

Figure 1:
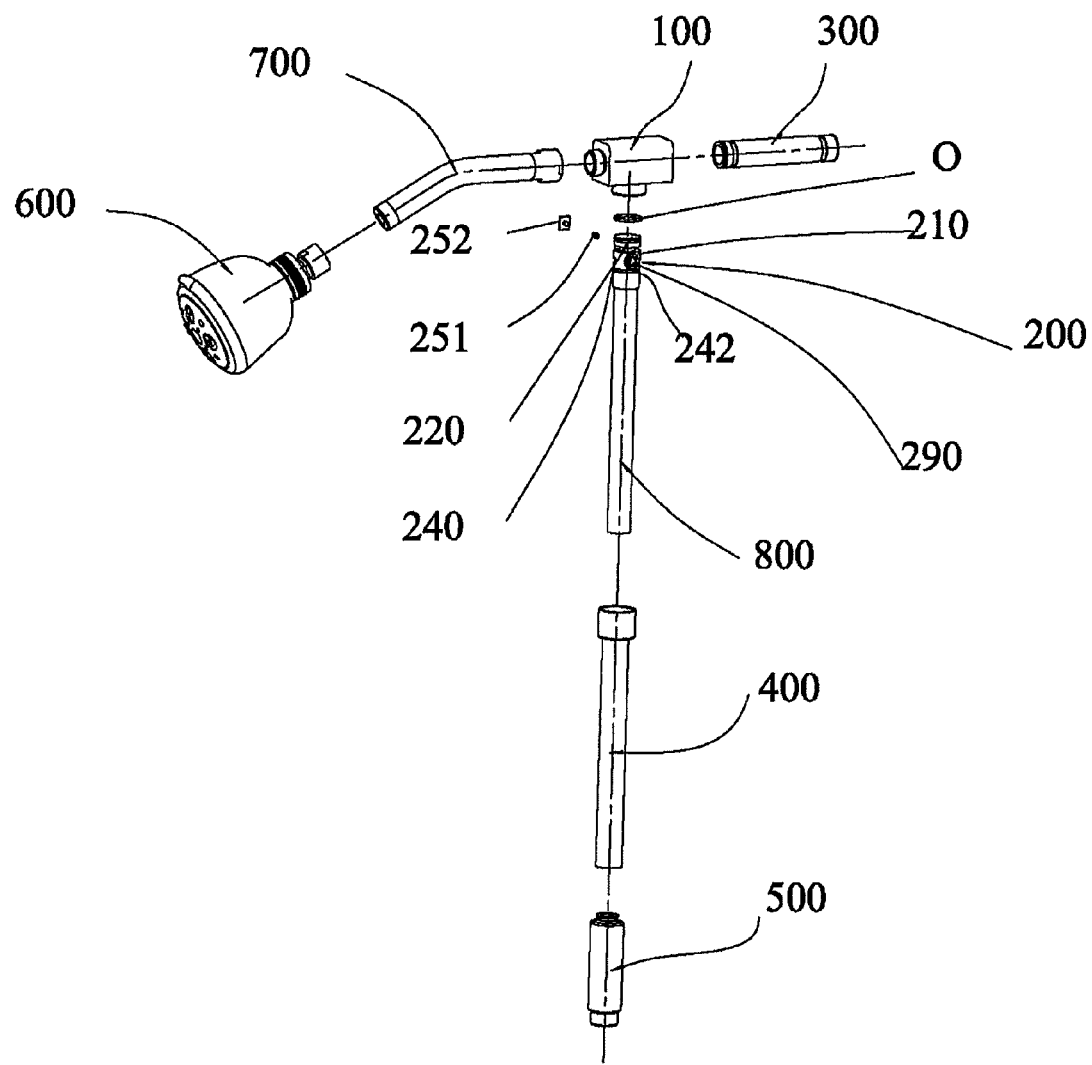
FIG. 1 is a perspective view of the revolving switch device of the preferred embodiment of the invention.
Figure 2:
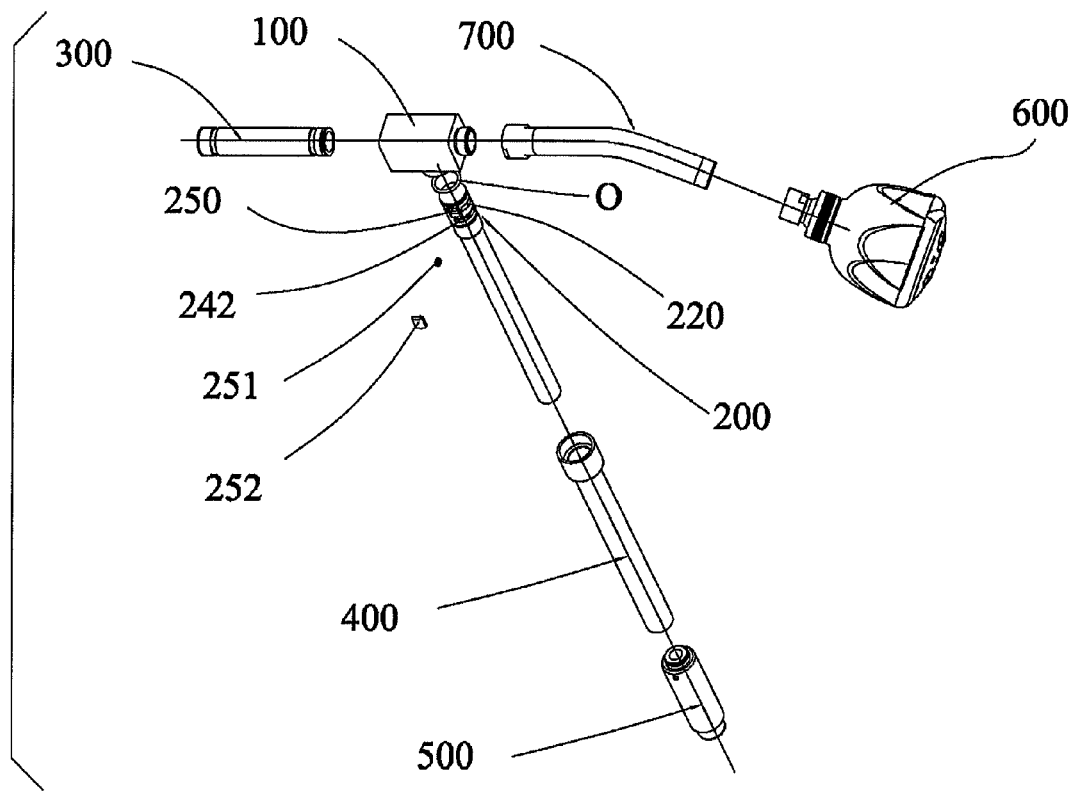
FIG. 2 is another perspective view of the revolving switch device of the preferred embodiment of the invention.

FIG. 1 and FIG. 2 are perspective views of the revolving switch device of the present invention.

The revolving switch device comprises a body 100, a plug 200, an inlet pipe 300, a pipe sleeve 400, a handle 500.

The body 100 has a first end and a second end respectively connected to an inlet pipe 300 and a first outlet 700 and a third end disposed in the bottom fixedly connected with a second outlet pipe 800; the body 100 has a first inlet hole 110 and a second inlet hole 120 on the surface connected to the inlet pipe 300, and a first water passage 130 along the first outlet pipe 700, the body 100 also has an installation hole 140 connected between the first inlet hole 110 and the first water passage 130.

The plug 200 is sealedly and revolvably installed in the installation hole 140 and is movable between a first position and a second position, according to a requirement. A sealing-ring O can be mounted between the two parts.

The plug has a head and a second outlet pipe 800, the head is provided with an outer revolving surface 210, an arc groove 220 is disposed in the outer surface 210, the arc groove 220 is means that the shape in axial projection is an arc. The center of the bottom of the plug 200 is concaved to form a second water passage 230, the outer revolving surface 210 of the plug 200 is also provided with a connecting hole 240, which is provided with an outer end 242 to connect with the inlet pipe 300 and an inner end 241 to connect with the second passage 230.

The outer surface 210 is provided with an installation groove 250, which is in the center of the outer revolving surface 210 opposite to the arc groove 220, the center of the installation groove 250 and the center of the arc groove 220 are in a same axial plane, the installation groove 250 comprises a sealing member 252 and an elastomer 251 urged on the sealing member 252, in this embodiment, the sealing member 252 is a sealing gasket and the elastomer can be a spring.

The plug 200 has a first position hole 260 and a second position hole 270 on the surface connected with the first water passage, a position mechanism is selectively inserted into the first position hole 260 or second position hole 270, the position mechanism comprises an elastomer 280 and a position pin 290 urged by the elastomer 280, the end of the position pin is formed to be a half-sphere.

To ensure that the passages can be switched by revolving, the axis of the plug 200 is perpendicular to the body 100, the outer end 242 of the connecting hole 240 is opposite to the installation groove 250 in axial projection.

The inlet pipe 300 is connected with the body 100, and connected to the first inlet hole 110 and second inlet hole 120;

The pipe sleeve 400 is sleeved on the outside of the second outlet pipe 800, and the upper end revolvably connected to the body, the lower end revolvably connected to the operating handle 500.

The operating handle 500 is fixedly connected to the lower end of the second outlet pipe 800.

The first outlet pipe 700 and the operating handle 500 are respectively connected to two water outlets, as is shown in the figures, the outlet function corresponding to the first outlet pipe 700 is an overhead shower 600, which is connected to the first outlet pipe 700.

Figure 3:
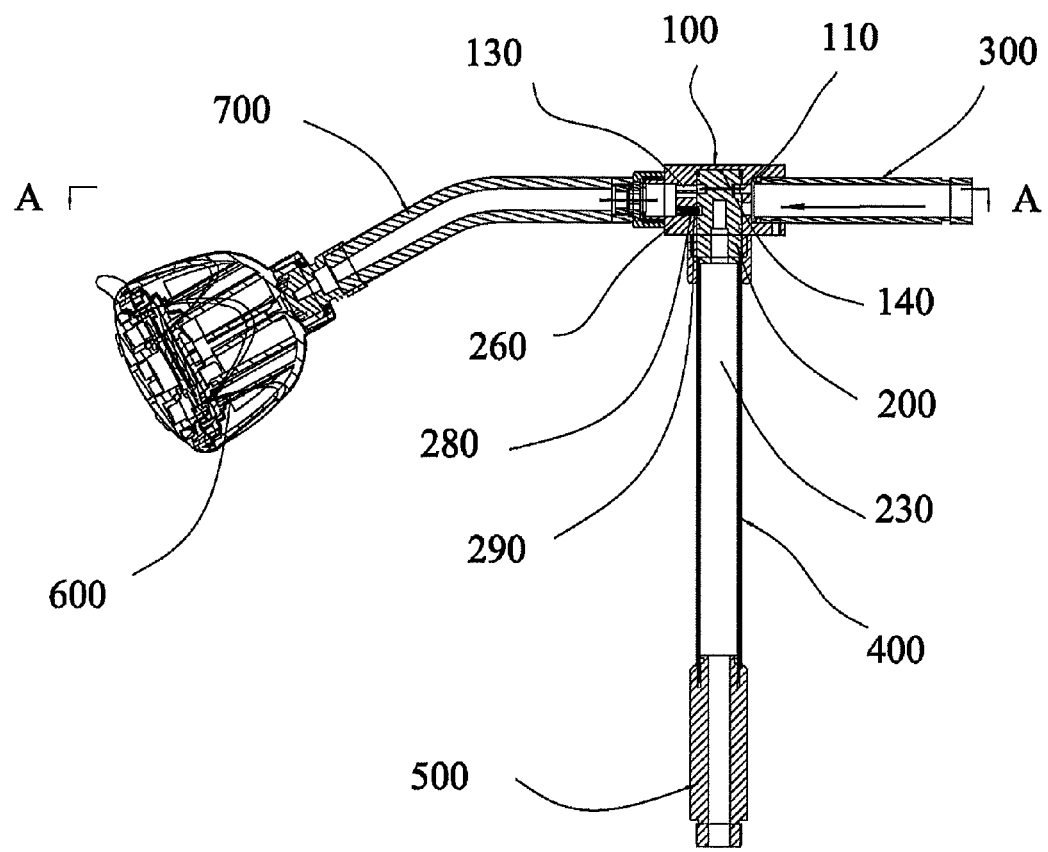
FIG. 3 is a sectional view of the revolving switch device of the preferred embodiment of the invention, herein the water is flow though the first water passage.
Figure 4:
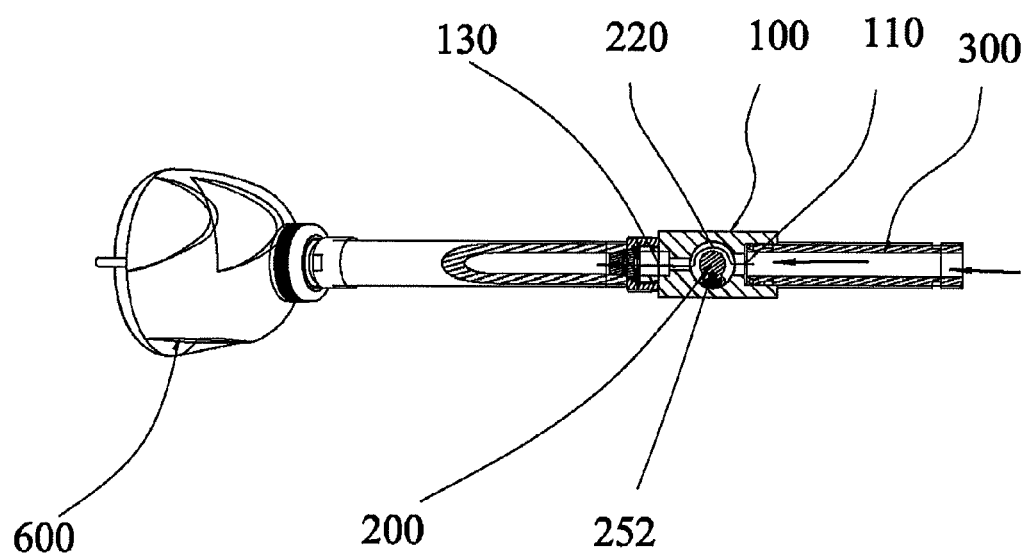
FIG. 4 is a sectional view taken along A-A direction of the revolving switch device of the preferred embodiment of the invention, herein the water is flow though the first water passage.
Figure 5:
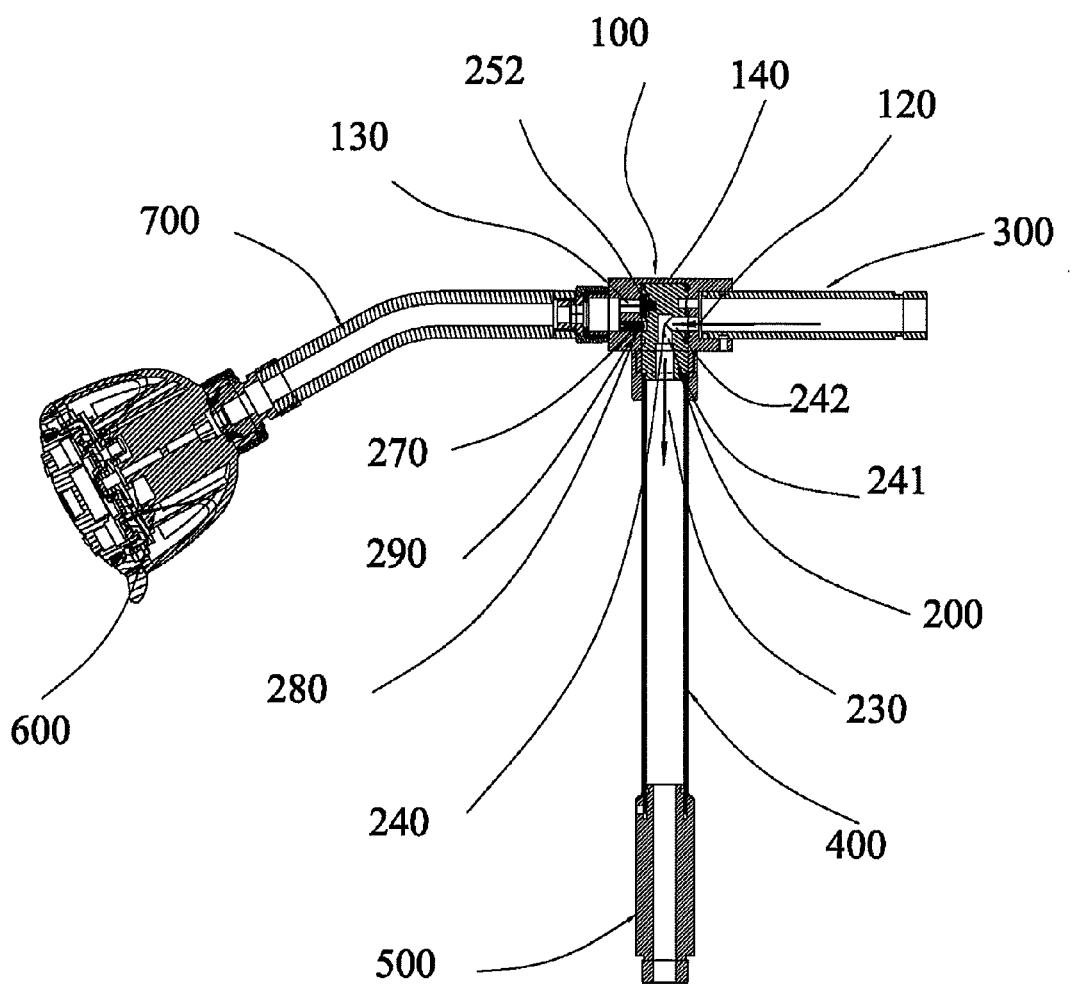
FIG. 5 is a sectional view of the revolving switch device of the preferred embodiment of the invention, herein the water is flow though the second water passage.

Referring to FIG. 3 to FIG. 5, the water outlet principle of the revolving switch device is as follows:

When the plug 200 is in the first position, the position pin 290 is inserted into the first position hole 260, and the position pin 290 is urged by the elastomer 280 to fix the plug 200 and stop the revolving, then the first inlet hole 110 is connected to the inlet pipe 300, and the arc groove 220 is connected to the first inlet hole 110, the water flow along the inlet pipe 300 into the first inlet hole 110 and flow along the arc groove 220 to connect with the first water passage 130, then pass though the first outlet pipe 700 of the first water passage, and is spayed out from the overhead shower 600 finally, while in this time, the outer end 242 of the connecting hole 240 is miss with the second inlet hole 120, thus the second water passage 230 is cut.

Revolve the operating handle 500 to let the plug 200 in the second position, herein the position pin 290 is pulled out from the first position hole 260 and insert into the second position hole 270, the position pin 290 is urged by the elastomer 280 and make the plug 200 fixed and stop revolving, then the first water passage 130 is sealed by the sealing member 252 cooperated with the elastomer 251, thus the first water passage 130 is cut; the second inlet 120 is connected to the inlet pipe 300, and the outer end 242 is connected to the second inlet hole 110, the water flow through the inlet pipe 300 into the second inlet hole 120 and the outer end 242 (connecting hole) to connected to the second water passage 230, then flow through the second outlet pipe 800 of the second water passage 230.

Similarly, revolve the operating handle 5000 on and on, different spray function can be achieved by switching the first water passage 130 and second water passage 230.

It will be apparent to those skilled in the art that various modifications and variations can be made in a water saving mechanism for a shower device of the present invention without departing from the spirit or scope of the invention. Thus, it is intended that the present invention cover the modifications and variations of this invention provided they come within the scope of the appended claims and their equivalents.

What is claimed is:

1. A revolving switch device, comprising:
   a body provided with an upper inlet hole and a lower inlet hole which are spaced vertically apart from each other, the body further including a first water passage and an installation hole positioned between the upper inlet hole and said first water passage; and
   a plug, sealed and revolvably mounted in the installation hole, that is capable of revolving between a first position and a second position, said plug having an outer revolving surface provided with an arc groove, and a bottom of said plug having a hollow portion that forms a second water passage, said plug being provided with a connecting hole having an inner end connecting to said second water passage and an outer end disposed at the outer revolving surface,
   wherein when the plug is in the first position, said arc groove connects the upper inlet hole to the first water passage, and the outer end of the connecting hole is disconnected from the lower inlet hole,
   further wherein when the plug is in the second position, the outer end of the connecting hole connects the lower inlet hole and the second water passage, and the arc groove is disconnected from the first water passage.

2. The revolving switch device according to claim 1 further comprising an inlet tube mounted on said body and connected to the upper and lower inlet holes.

3. The revolving switch device according to claim 1, wherein said outer revolving surface has an installation groove, said installation groove being provided with an elastomer and a sealing member which is urged outwardly by said elastomer.

4. The revolving switch device according to claim 3, wherein said installation groove is disposed in a center of said outer revolving surface which is opposite to a portion of said arc groove, said center of said installation groove being in a same axial plane as the arc groove.

5. The revolving switch device according to claim 1, wherein the axis of said plug is perpendicular to a surface of said body, the outer end of said connecting hole is opposite to the installation groove on the plug in the axial direction.

6. The revolving switch device according to claim 1, wherein said plug is provided with a first position hole corresponding to said first position and a second position hole corresponding to said second position, and said body is provided with an elastomer and a position pin urged by said elastomer, said position pin is selectively inserted into said first position hole or second position hole.

7. The revolving switch device according to claim 1 further wherein the body includes a second outlet pipe that the second water passage is disposed within, the device comprising:
   a sleeve; and
   an operating handle which is fixed to a lower end of said second outlet pipe,
   wherein said sleeve is sleeved on said plug and an upper end and lower end of the sleeve are revolvably connected to the body and operating handle respectively.

\* \* \* \* \*